United States Patent [19]

Kabe et al.

[11] Patent Number: 4,735,249
[45] Date of Patent: Apr. 5, 1988

[54] PNEUMATIC RADIAL PASSENGER-CAR TIRE

[75] Inventors: Kazuyuki Kabe, Hiratsuka; Tuneo Morikawa, Hadano; Shuji Takahashi, Hiratsuka, all of Japan

[73] Assignee: The Yokohama Rubber Co., Ltd., Tokyo, Japan

[21] Appl. No.: 864,976

[22] Filed: May 20, 1986

[30] Foreign Application Priority Data

Jun. 5, 1985 [JP] Japan ................................ 60-120579

[51] Int. Cl.$^4$ .............................................. B60C 15/06
[52] U.S. Cl. .................................... 152/539; 152/542; 152/546
[58] Field of Search ............... 152/539, 542, 543, 555, 152/46, 451, 541; 57/902

[56] References Cited

U.S. PATENT DOCUMENTS

| | | | |
|---|---|---|---|
| 3,774,663 | 11/1973 | Maontagne | 152/362 |
| 4,100,955 | 7/1978 | Pottinger et al. | 152/543 X |
| 4,265,292 | 5/1981 | Inoue | 152/354 |
| 4,320,791 | 3/1982 | Fujii et al. | 152/362 |
| 4,342,353 | 8/1982 | Tamura et al. | 152/362 |
| 4,435,236 | 3/1984 | Inae et al. | 156/132 |
| 4,531,561 | 7/1985 | Ippen et al. | 152/564 X |
| 4,535,027 | 8/1985 | Kobashi et al. | 428/364 |
| 4,573,511 | 3/1986 | Kabe et al. | 152/539 X |

FOREIGN PATENT DOCUMENTS 3519212 12/1985 Fed. Rep. of Germany .
56-40043 9/1981 Japan .................................. 152/527

OTHER PUBLICATIONS

Rubber Technology and Manufacture edited by C. M. Blow BSC, PHD, FRIC, FIRI.

Primary Examiner—Jerome Massie
Assistant Examiner—Ramon R. Hoch
Attorney, Agent, or Firm—Armstrong, Nikaido, Marmelstein & Kubovcik

[57] ABSTRACT

A pneumatic radial passenger-car tire comprising a carbon fiber cord layer disposed between a carcass layer on the side of an inner liner and a bead filler all along the circumference of the tire, and having a height thereof between a bead heel and the top end thereof equal to or larger than the height of the bead filler between the bead heel and the top end thereof.

8 Claims, 6 Drawing Sheets

PNEUMATIC RADIAL PASSENGER-CAR TIRE

BACKGROUND

The present invention relates to a pneumatic radial passenger-car tire, which is improved in the driving stability, comfortableness in riding, and high speed durability by improving the vicinities of tire beads.

With a recent trend of ever-perfecting freeway networks and upgrading performances of passenger cars, there seems no limit in the upgrading performance as well as increasing versatility required of tires.

For example, HR tires capable of traveling at speeds higher than SR tires, and VR tires capable of traveling at further higher speeds have been demanded. Furthermore, development of flat tires superior in driving stability has been demanded.

On the other hand, from the standpoint of vehicles, there is a demand for tires with flatness as usual but capable of traveling at higher speeds and superior in driving stability in consideration to tire houses.

In view of the above, tire manufactureres have heretofore tried to cope with such various demands by additionally providing reinforcing sheets made of organic fiber cords in the bead portions of a tire, which is called "bead portion reinforcing layers." Since the reinforcing sheets have been made of the same material as a conventional material constituting a carcass layer, however, reinforcement has been so insufficient that the above-mentioned demand, namely the demand for tires with flatness as usual but capable of traveling at higher speeds and superior in driving stability, could not have been met.

On the basis of a reflection that the same material as that constituting a carcass layer is unsatisfactory, there has later been proposed use of a reinforcing sheet comprising steel cords as the bead portion reinforcing layer. Although in this case the effect of such use is recognized in improvements in the high speed performance, driving stability, and the like, however, the downgrading of comfortableness in riding is intolerably serious due to the high flexural rigidity of steel cords. Thus, further improvement has been demanded.

SUMMARY

The present invention has been made in view of the above-mentioned situation. An object of the present invention is to provide a pneumatic radial passenger tire which is improved in the driving stability and the high speed durability without detriment to the comfortableness in riding.

In attaining the object, the gist of the present invention resides in a pneumatic radial passenger-car tire comprising bead portions comprising a bead filler disposed on a bead wire and a carcass layer folded around said bead wire from the inner side of the tire to the outer side of the tire so as to wrap said bead filler, wherein a carbon fiber cord layer is disposed between a carcass layer on the side of an inner liner and said bead filler all along the circumference of the tire, and that the height of said carbon fiber cord layer between a bead heel and the top end thereof is equal to or larger than the height of said bead filler between said bead heel and the top end thereof.

The foregoing and other objects, and features of the present invention will become apparent from the following description.

THE DRAWINGS

THE PREFERRED EMBODIMENT

Figure 1:
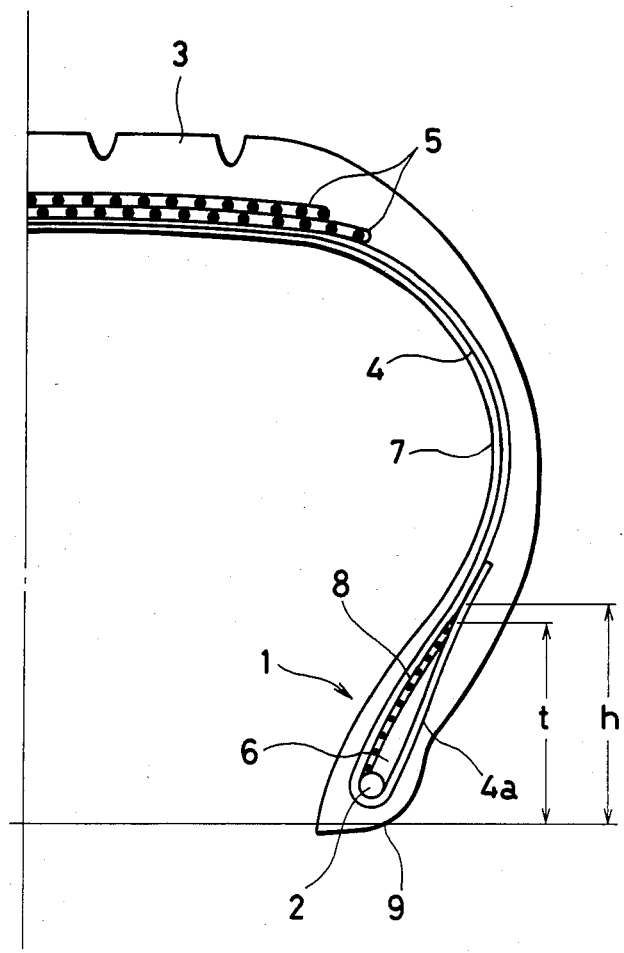
FIG. 1 is a meridional semi-crosssectional view of an example of the pneumatic radial passenger-car tire of the present invention.
Figure 2:
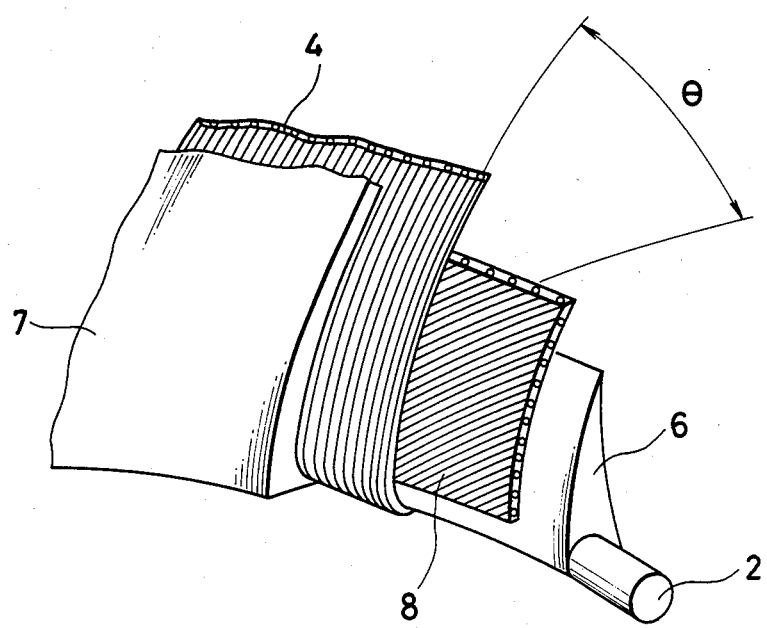
FIG. 2 is an enlarged view of the bead portion of the example.

In FIGS. 1 and 2, a carcass layer 4 having a cord angle of 70° to 90° with respect to the circumferential direction of a tire is disposed between a pair of left and right bead portions 1 and 1. Two belt layers 5 are disposed on the tread portion 3 of the carcass layer 4 substantially over the whole area of the tread portion 3. A bead wire 2 is annularly provided in a bead portion 1, and a bead filler 6 is disposed on the bead wire. The carcass layer 4 is folded around the bead wire 2 from the inner side of the tire to the outer side of the tire so as to wrap the bead filler 6 to form a folded portion 4a. An inner liner 7 is disposed on the inner side of the tire.

At least one layer may be disposed as the carcass layer 4, the cords of which are generally made of a chemical fiber such as nylon, polyester, or aramid (aromatic polyamide) fiber.

Cords constituting the belt layers 5 may be ones as used in common tires, preferred examples of which include steel, aramid, and rayon cords. Nylon, polyester, and other cords can also be used.

In order to improve the high speed durability, a belt cover layer (not illustrated) may be further provided on the belt layers 5. Nylon cords are generally used as the cords of the belt cover layer. Its cord angle is substantially 0°, i.e. parallel, with respect to the circumferential direction of the tire.

In the present invention, a carbon fiber cord layer 8 is disposed between the carcass layer 4 on the side of the inner liner 7 and the bead filler 6 all along the circumference of the tire. The reasons for this are as follows.

The vicinity of the bead portion has hitherto been reinforced by disposing a layer of organic fiber cords such as nylon cords or steel cords in the bead portion. The reinforcing effect of the organic fiber cord layer is, however, insufficient. This is because the rigidity (tensile strength, flexural rigidity, etc.) of the organic fiber is not sufficiently high. On the other hand, although the steel cord layer has a sufficient rigidity, the comfort in riding is downgraded due to too high a rigidity thereof when the steel cord layer is used as the bead portion reinforcing layer. Besides, when the steel cord layer was used, an inconvenience in an aspect of weight is experienced from a large tire weight.

On the other hand, the carbon fiber has a sufficient rigidity as compared with conventional organic fibers. Nevertheless, the rigidity is so lower than that of steel cords, particularly in terms of flexural rigidity, that the effect of reinforcing the bead portion can be exhibited without detriment to the comfortableness in riding. Also in the aspect of weight, the carbon fiber cord is by far lighter than the steel cord and comparable to organic fiber cords.

In the present invention, as described above, the height h of the carbon fiber cord layer 8 disposed in the bead portion 1 between a bead heel 9 and the top end thereof is identical with or larger than the height t of the bead filler 6 between the bead heel 9 and the top end thereof (namely, h is equal to or larger than t).

Specifically, although the above-mentioned reinforcement of the vicinity of the bead by disposing the carbon fiber cord layer 8 in the bead portion 1 can not only suppress the movement of the bead portion of the tire during traveling but also increase the rigidity of the vicinity of the bead portion, setting of the height h equal to or larger than t can sufficiently suppress the movement of the vicinity of the bead portion during high speed traveling to eliminate occurrence of standing waves and can sufficiently increase the lateral rigidity to sufficiently improve the driving stability.

Additionally speaking, it is known that the carbon fiber is very strong against tension but weak against compression due to its crystalline structure. Where a carbon fiber cord layer is disposed on the outer side of the tire in the same way as in a conventional reinforcement structure of the bead portion, therefore, a compression force is put on the carbon fiber cords, when the bead portion is subjected to flexural deformation with a rim flange as the support, to undesirably reduce the durability. In view of the above, in the present invention, the carbon fiber cord layer 8 is disposed between the carcass layer 4 on the side of the inner liner 7 and the bead filler 8 and the height h is set equal to or larger than the height t, as described above. This can allow the high modulus function of the carbon fiber to effectively develop.

Although the carbon fiber cord constituting the carbon fiber cord layer 8 is not particularly limited in the type in so far as it is made of a carbon fiber, the following one is preferred.

Specifically, the preferred carbon fiber cord is one obtained by coating a carbon fiber having a tensile strength of 100 kg/mm$^2$ or higher, preferably 200 kg/mm$^2$, and a tensile elastic modulus of 5,000 kg/mm$^2$, preferably 15,000 kg/mm$^2$, with 10 to 50%, based on the weight per unit length of the carbon fiber, of an adhesive and twisting the resultant coated fiber at a twist coefficient, a value K as expressed by the following formula, of $0 \leq K \leq 1,800$.

$$K = T\sqrt{D}$$

K: twist coefficient
T: number of turns per 10 cm of cord
D: total denier of cord A liquid mixture of a resorcinol-formalin precondensate and a rubber latex (hereinafter referred to briefly as RFL) may be used as the adhesive. The carbon fiber is impregnated with RFL, dried, heat-treated, and twisted in a predetermined manner to form a cord.

The amount of RFL applied to the carbon fiber is preferably 10 to 50%. When it is less than 10%, the bonding strength of the resulting carbon fiber cord and a coat rubber (covering rubber) is insufficient and the flexural fatigue resistance of the carbon fiber cannot be improved. On the other hand, when it is more than 50%, insufficient drying and air bubble formation in the adhesive layer ensues from too thick an adhesive layer in the drying heat treatment of the adhesive to present a difficulty in obtaining a uniform cord. The preferred amount of RFL applied to the carbon fiber is 20 to 40%.

In coating the carbon fiber with RFL, it is important to allow the RFL to sufficiently infiltrate into the filaments of the carbon fiber for improving the flexural fatigue resistance. In this respect, impregnation of the carbon fiber with the RFL is preferably effected in the form of opened filaments.

Although the carbon fibers thus treated with the RFL can be surely bundled even without twisting thereof due to sufficient adhesion of the RFL, twisting to some extent is preferred since the fibers can be bundled more easily thereby. Excessive extent of twisting results in notable deterioration from the high strength and high elasticity modulus characteristic of the carbon fiber. Accordingly, twisting is effected at a twist coefficient K of 1,800 or less, preferably $300 \leq K \leq 1,500$.

As for the twisting structure, either a so-called folded structure obtained by first twist of each of several carbon fiber filaments and subsequent second twist of several carbon fiber filaments thus twisted together, or a single twist structure obtained by twist of a single carbon fiber filament may be chosen.

The carbon fiber cord layer 8 comprises the above-mentioned carbon fiber cords embedded in a coat rubber (cover rubber) having a 100% modulus of 30 to 70 kg/cm$^2$. The cord density is preferably such that 20 to 60 carbon fiber cords (parallel) in the coating rubber is included per 5 cm in a direction perpendicular to the cords.

When the 100% modulus of the coating rubber is less than 30 kg/cm$^2$, the elasticity of the bead portion reinforcing layer is so reduced that the reinforcing effect cannot be exhibited, leading to reduction in the driving stability. When it is more than 70 kg/cm$^2$, the coating rubber is too rigid, disadvantageously leading to reduction in productivity, which is caused by, for example, a scorching phenomenon due to heat generation during coating, namely so-called burning.

Accordingly, the 100% modulus of the coating rubber is preferably 30 to 70 kg/cm$^2$.

When the end count exceeds 60, infiltration of the coating rubber in between the cords is undesirably blocked to reduce the bonding strength. On the other hand, when it is less than 20, the reinforcing effect is insufficient.

It is preferred that the cords of the carbon fiber cord layer 8 intersect the cords of the carcass layer 4 at an angle of 20° to 70° ($\theta$ in FIG. 2). Since such intersection strongly fetters each carcass cord, the reinforcing effect of the bead portion reinforcing layer is so notably exhibited that the high speed durability and the driving stability can be improved. When the intersectional angle $\theta$ exceeds 70°, poor workability disadvantageously ensues as can be seen in a difficulty encountered in cutting and liability to give rise to wrinkling during molding work. On the contrary, when it is less than 20°, the fettering force for each carcass cord is unfavorably lowered.

The following Example will specifically illustrate the effect of the present invention.

EXAMPLE

A tire according to the present invention, a comparative tire No. 1, and a comparative tire No. 2 were prepared each in accordance with the following specifications.

(1) Tire according to the present invention:

Tire size: 185/70HR 13. A carbon fiber cord layer is positioned between a carcass layer 4 on the side of an inner liner 7 and a bead filler 6 as shown in FIG. 1. The carbon fiber cord layer prepared by embedding 40 carbon fiber cords [1,800 d/2, $10^s \times 10^z$ (T/10 cm), amount of adhesive: 30%] per 5 cm in a direction perpendicular to the cords in a rubber having a 100% modulus of 45 kg/cm$^2$ and having a width of 50 mm and a thickness of 1.5 mm is disposed at an intersectional angle of 30° with carcass cords. The carcass layer is composed of a radial carcass comprising a 1,500 d/2 polyester cord layer. A belt layer has a double layer structure comprising steel cords [1×5 (0.25)] mutually intersected at an angle of 20° with respect to the circumferential direction of the tire. h=50 mm. t=40 mm.

Figure 3:
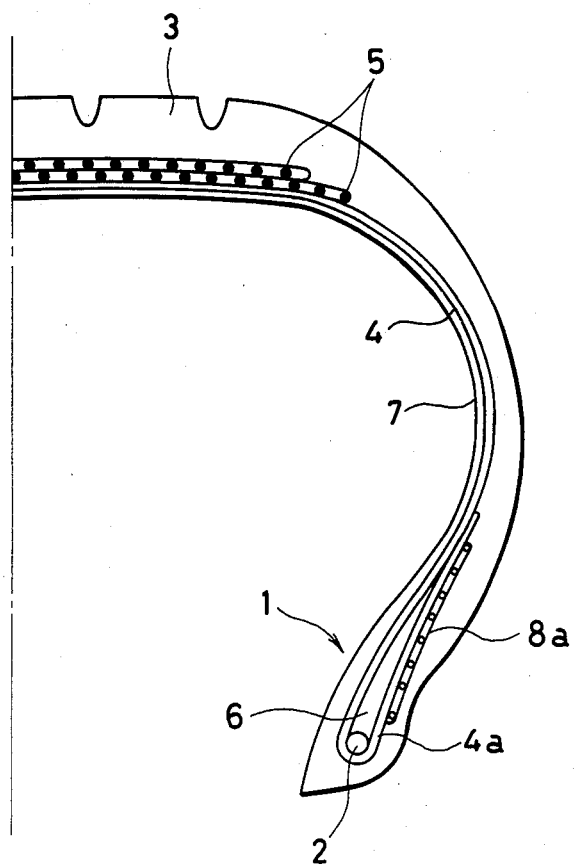
FIGS. 3 and 4 are meridional semi-crosssectional views of examples of conventional pneumatic radial passenger-car tires.

(2) Comparative tire 1:

Tire size: 185/70HR 13. A bead portion reinforcing layer is positioned outside the fold-back portion 4a of a carcass layer as shown in FIG. 3. The bead portion reinforcing layer comprising nylon cords is indicated by 8a in FIG. 3. The bead portion reinforcing layer prepared by embedding 40 nylon cords of 840 d/2 per 5 cm in a direction perpendicular to the cords in a rubber having a 100% modulus of 27 kg/cm$^2$ and having a width of 50 mm and a thickness of 1.0 mm is disposed at an intersectional angle of 30° with respect to carcass cords. The others are the same as in the case of the above-mentioned tire according to the present invention.

Figure 4:
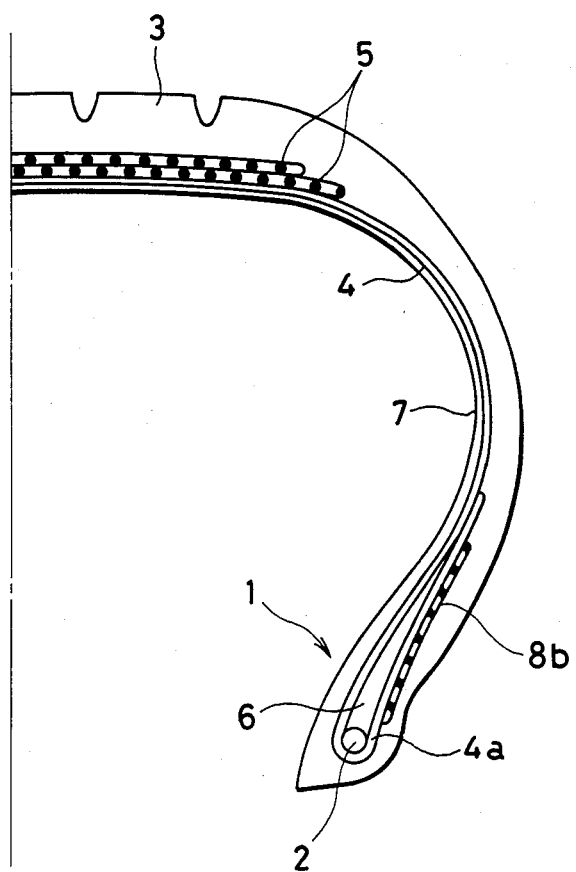

(3) Comparative tire 2:

Tire size: 185/70HR 13. A bead portion reinforcing layer is positioned outside the fold-back portion 4a of a carcass layer as shown in FIG. 4. The bead portion reinforcing layer comprising steel cords is indicated by 8b in FIG. 4. The bead portion reinforcing layer prepared by embedding 40 steel cords [1×5 (0.25)] per 5 cm in a direction perpendicular to the cords in a rubber having a 100% modulus of 45 kg/cm$^2$ and having a width of 50 mm and a thickness of 1.5 mm is disposed at an intersectional angle of 30° with respect to carcass cords. The others are the same as in the case of the above-mentioned tire according to the present invention.

The above-mentioned tire according to the present invention, comparative tire 1, and comparative tire 2 were subjected to the following tests.

Driving Stability Test

The driving stability test was conducted using an indoor cornering tester.

The indoor cornering tester provides a substitutive value of driving stability which is a value obtained by dividing by 2 a cornering force built up when a slip angle of 2° is given to a tire on a drum having a diameter of 2,500 mm.

The test conditions include a rim of 5-J×13, an air pressure P of 1.9 kg/cm$^2$, a load W of 450 kg, and a speed of 20 kg/hr. The test results are shown in terms of an appropriate index in FIG. 5. The larger the figure, the better the driving stability.

Figure 5:
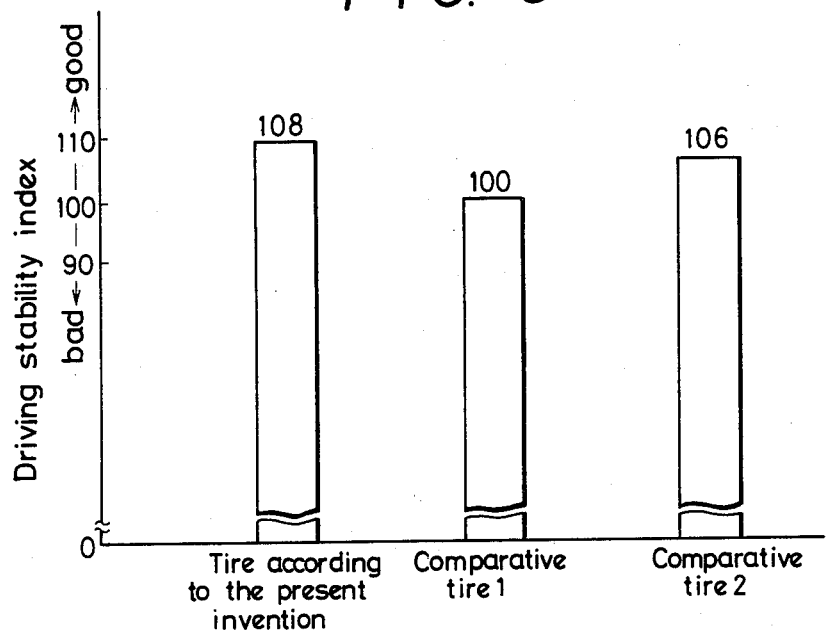
FIG. 5 is a diagram showing a graph of driving stabilities of tires.

In FIG. 5, values are expressed in terms of an index as against a value of 100 as the driving stability of the tire using nylon cords in the bead portion reinforcing layer (comparative tire 1). It can be understood from FIG. 5 that the tire according to the present invention is superior by about 8% in driving stability to the comparative tire 1.

High Speed Performance Test

The high speed performance test was conducted using an indoor drum tester (diameter: 1,707 mm).

The test conditions include a rim of 5-J×13, an air pressure P of 3.0 kg/cm$^2$, and a load W of 450 kg. The traveling speed was increased from 170 km/hr to one causing destruction at a rate of 10 km/hr every 10 minutes. The test results are shown in terms of an appropriate index in FIG. 6. The larger the figure, the better the high speed performance.

Figure 6:
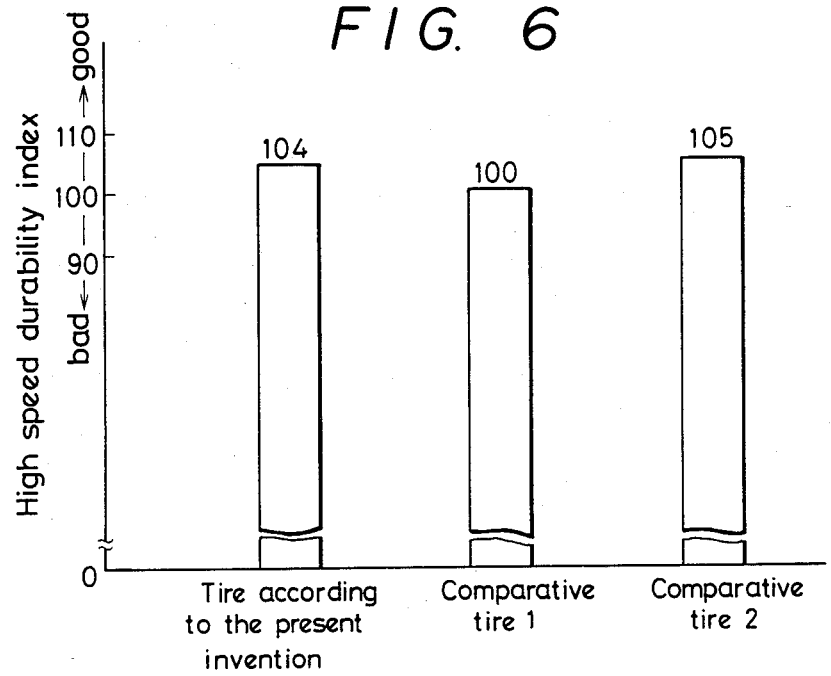
FIG. 6 is a diagram showing a graph of high speed performances of the tires.

In FIG. 6, values are expressed in terms of an index as against a value of 100 as the high speed performance of the comparative tire 1. It can be understood from FIG. 6 that the tire according to the present invention is superior by about 4% in driving stability to the comparative tire 1, and is comparable in driving stability to the comparative tire 2.

Vibratory Ride Test

The vibratory ride test was conducted using an indoor protrusion tester.

The indoor protrusion tester comprises a drum of 2,500 mm in diameter having in one portion on the circumference thereof a semi-circular protrusion of 20 mm in diameter attached thereto. The magnitude of axial force, which is a value representing the comfortableness in vibratory riding, is measured by detecting an axial force in a forward and backward direction when a test tire runs over the protrusion.

The test conditions include a rim of 5-J×13, an air pressure P of 1.9 kg/cm$^2$, and a load W of 450 kg. The average value was found from those values obtained at respective speeds of 60, 80, 100, and 120 km/hr. The test results are shown in terms of an appropriate index in FIG. 7. The larger the figure, the better the comfortableness in vibratory riding.

Figure 7:
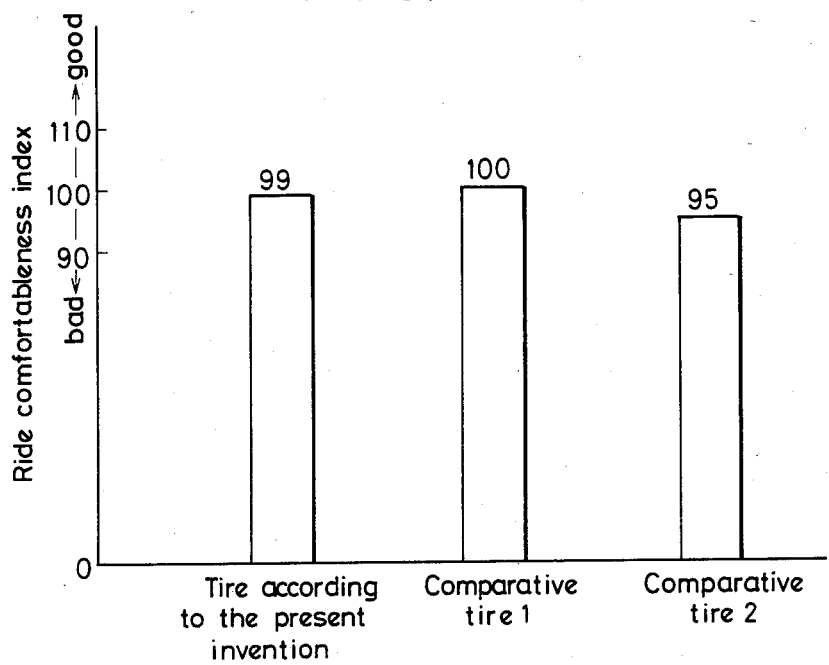
FIG. 7 is a diagram showing a graph of comfortableness in riding of the tires.

In FIG. 7, values are expressed in terms of an index as against a value of 100 as the comfortableness in vibratory riding of the tire using nylon cords in the bead portion reinforcing layer (comparative tire 1). It can be understood from FIG. 7 that the tire according to the present invention is comparable to the comparative tire 1, and is superior to the comparative tire 2.

As described above, since a carbon fiber cord layer with a predetermined height is provided in a predetermined position of the bead portion, the tire of the present invention can exhibit the following effects (a) and (b).

(a) The reinforcing effect is larger than that in a conventional tire having a bead portion reinforcing layer of organic fiber cords disposed in the bead portion, leading to superior high speed performance and driving stability.

(b) The flexural rigidity is by far lower than that in a tire using steel cords in the bead portion reinforcing layer, leading to superior high speed performance and comfortableness in riding.

Accordingly, in accordance with the present invention, the driving stability and high speed durability can be satisfactorily improved without detriment to the comfortableness in riding.

We claim:

1. A pneumatic radial passenger-car tire having bead portions, said bead portions comprising a bead filler disposed on a bead wire and a carcass layer folded around said bead wire from the inner side of the tire to the outer side of the tire so as to wrap around said bead filler, wherein a carbon fiber cord layer is disposed between a carcass layer and the axial inner side of said bead filler all along the circumference of the tire, and wherein the height of said carbon fiber cord layer between a bead heel and the top of said carbon fiber cord layer is equal to or greater than the height of said bead filler between said bead heel and the top of said bead filler.

2. A pneumatic radial passenger-car tire as claimed in claim 1, wherein said carbon fiber cord layer comprises carbon fiber cords embedded in a coat rubber having a 100% modulus of 30 to 70 kg/cm², while the cord density is such that 20 to 60 carbon fiber cords (parallel) in said coat rubber is included per 5 cm in a direction perpendicular to the cords.

3. A pneumatic radial passenger-car tire as claimed in claim 1, wherein cords of said carbon fiber cord layer intersect cords of said carcass layer at an angle of 20° to 70°.

4. A pneumatic radial passenger-car tire as claimed in claim 2, wherein cords of said carbon fiber cord layer intersect cords of said carcass layer at an angle of 20° to 70°.

5. A pneumatic radial passenger-car tire as claimed in claim 1, wherein the carbon fiber cords of said carbon fiber cord layer are those obtained by coating a carbon fiber having a tensile strength of 100 kg/mm² or higher and a tensile elastic mudulus of 5,000 kg/mm² with 10 to 50%, based on the weight per unit length of said carbon fiber, with an adhesive and twisting the resultant coated fiber at a twist coefficient, a value K as expressed by the following formula, of $0 \leq K \leq 1,800$:

$$K = T\sqrt{D}$$

K: twist coefficient
T: number of turns per 10 cm of cord
D: total denier of cord.

6. A pneumatic radial passenger-car tire as claimed in claim 2, wherein the carbon fiber cords of said carbon fiber cord layer are those obtained by coating a carbon fiber having a tensile strength of 100 kg/mm² or higher and a tensile elastic mudulus of 5,000 kg/mm² with 10 to 50%, based on the weight per unit length of said carbon fiber, with an adhesive and twisting the resultant coated fiber at a twist coefficient, a value K as expressed by the following formula, of $0 \leq K \leq 1,800$:

$$K = T\sqrt{D}$$

K: twist coefficient
T: number of turns per 10 cm of cord
D: total denier number of cord.

7. A pneumatic radial passenger-car tire as claimed in claim 5, wherein said adhesive is a liquid mixture of a resorcinol-formalin precondensate and a rubber latex, and the amount of said adhesive applied to said carbon fiber is 10 to 50%.

8. A pneumatic radial passenger-car tire as claimed in claim 6, wherein said adhesive is a liquid mixture of a resorcinol-formalin, precondensate and a rubber latex, and the amount of said adhesive applied to said carbon fiber is 10 to 50%.

* * * * *